US006057838A

United States Patent [19]

Kuwajima et al.

[11] Patent Number: 6,057,838

[45] Date of Patent: May 2, 2000

[54] WINDOW CONTROL DEVICE FOR DISPLAYING A PLURALITY OF WINDOWS ON A DISPLAY SCREEN

[75] Inventors: Hidenori Kuwajima, Yamatokoriyama; Toshio Matsumoto, Nara, both of Japan

[73] Assignee: Sharp Kabushiki Kaisha, Osaka, Japan

[21] Appl. No.: 09/020,626

[22] Filed: Feb. 9, 1998

[30] Foreign Application Priority Data

Feb. 10, 1997 [JP] Japan .................................... 9-026569

[51] Int. Cl.7 ................................ G06F 3/00; G09G 5/00

[52] U.S. Cl. ........................... 345/340; 345/115; 345/344

[58] Field of Search .................................... 345/340, 342, 345/343, 344, 345, 115

[56] References Cited

U.S. PATENT DOCUMENTS 5,262,764 11/1993 Inamori et al. ......................... 345/340

*Primary Examiner*—Raymond J. Bayerl
*Assistant Examiner*—Sy D. Luu
*Attorney, Agent, or Firm*—Morrison & Foerster LLP

[57] ABSTRACT

The window control device of this invention for displaying a plurality of window regions superimposed on one another on a display screen includes: mask data production means for producing mask data so that whether or not pixel data for displaying a predetermined window region among the plurality of window regions should be displayed on a predetermined pixel of the display screen is determined before the predetermined window region is displayed, and subsequently whether or not pixel data for displaying the predetermined window region should be displayed on at least one pixel which is consecutive to the predetermined pixel is determined, so that the mask data can indicate whether or not the respective pixel data should be displayed on the predetermined pixel and the at least one pixel; and pixel data renewing means for renewing the pixel data for the predetermined pixel based on the mask data, as well as the pixel data for the at least one pixel which is consecutive to the predetermined pixel based on the mask data.

8 Claims, 5 Drawing Sheets

WINDOW CONTROL DEVICE FOR DISPLAYING A PLURALITY OF WINDOWS ON A DISPLAY SCREEN

BACKGROUND OF THE INVENTION

1. Field of the Invention

The present invention relates to a window control device for displaying a plurality of windows superimposed on one another on a display screen.

2. Description of the Related Art

In a device having a window processing function, a plurality of windows are displayed on a display screen D by superimposing one window on another as shown in FIG. 4, for example. When a window W2 which is intended to be displayed is overlapped by windows W0 and W1 as shown in FIG. 4, the profile of the portion of the window W2 which is not covered by the windows W0 and W1 is complicated.

A problem arises when such a window with a complicated profile is intended to be displayed by a software in a device with low power consumption such as a portable terminal. That is, since high-speed processing of a CPU is difficult in such a device, the load on the CPU becomes large. This not only markedly increases the image processing time but also adversely affects the processing speed of the entire system.

In order to overcome the above problem, the applicant of the present invention proposed a technique where the window processing function is realized by a simple hardware configuration so as to obtain a high-speed image display without increasing the processing speed of the CPU (Japanese Laid-Open Publication No. 4-97288).

In this conventional technique, a coordinate data register is provided for storing data on the coordinates of rectangular window regions on a display screen. The coordinate data of a window region is composed of a total of four values representing the top, bottom, left, and right ends of the window region. When a plurality of window regions are superimposed on one another, coordinate data registers of the number equal to the number of window regions are required for storing the coordinate data which are each composed of the four values.

The above technique further provides an operation circuit which, when pixel data is allocated to each pixel and displayed, compares the coordinates of the pixel with the coordinate data of a window region to determine whether the pixel is inside or outside the window region. This determination by the operation circuit is based on the comparison of the x coordinate of the pixel with the right and left ends of the window region and the comparison of the y coordinate of the pixel with the top and bottom ends of the window region. Accordingly, a total of four operation circuits (subtraction circuits) for the top, bottom, left, and right ends are required. By synthesizing the comparison results obtained by the four operation circuits, it is possible to determine whether the pixel is located inside or outside the window region.

Since the above determination is required for the plurality of window regions, a current window pointer is employed. That is, the current window pointer is increased by one when the determination for one window region is completed, to thereby proceed to the determination for the next window region. After the determinations for an intended number of window regions has been completed, the determination results are synthesized. Based on the synthesized results, data indicating whether pixel data for a pixel in the window region should be displayed or masked is produced. Such data is called mask data.

The mask data is used at the control of a display data memory (VRAM) by a VRAM control circuit.

FIG. 5 is a flowchart showing a procedure for producing the mask data and the control of the VRAM by the VRAM control circuit.

First, when an instruction for renewing the pixel data for at least one pixel is received (step 41), the current window pointer and the mask data are initialized (step 42). The mask data is produced by determining whether the pixel is inside or outside the window region indicated by the current window pointer (steps 43 and 44). Then, whether or not the determination is completed for all the window regions is judged (step 45). If the determination is not completed (N), the current window point is increased by one (step 46), and whether or not the pixel is inside or outside the next window region is determined to thereby produce mask data. This mask data is then superimposed on the mask data previously obtained at step 44 to renew the mask data (step 47). The process then returns to step 45, where whether or not the determinations for all the window regions are completed is judged. If the determination is completed (Y), the display data memory is accessed (step 48), and whether or not pixel data for one pixel should be displayed is determined based on the final mask data. If it is determined to display the pixel data for the pixel, the pixel data is written in an address representing the pixel in the display data memory. If it is determined to mask the pixel data for the pixel, the pixel data is not written.

In the conventional procedure shown in FIG. 5, the process returns to step 41 every time pixel data for one pixel is written. This requires the procedure to repeat the operations at steps 41 to 48 for every pixel in the number of window regions. The final production of the mask data is therefore repeated for every pixel. Accordingly, as the number of window regions which are superimposed on one another on the display screen becomes larger, the operation time becomes longer, resulting in a decrease in the display speed on the display screen and an increase in power consumption.

In view of the foregoing, the purpose of the present invention is to provide a window control device which does not extend the operation time, lower the display speed on the display screen, or increase the power consumption even if the number of window regions on the display screen increases.

SUMMARY OF THE INVENTION

The window control device of this invention for displaying a plurality of window regions superimposed on one another on a display screen includes: mask data production means for producing mask data so that whether or not pixel data for displaying a predetermined window region among the plurality of window regions should be displayed on a predetermined pixel of the display screen is determined before the predetermined window region is displayed, and subsequently whether or not pixel data for displaying the predetermined window region should be displayed on at least one pixel which is consecutive to the predetermined pixel is determined, so that the mask data can indicate whether or not the respective pixel data should be displayed on the predetermined pixel and the at least one pixel; and pixel data renewing means for renewing the pixel data for the predetermined pixel based on the mask data, as well as the pixel data for the at least one pixel which is consecutive to the predetermined pixel based on the mask data.

Alternatively, the window control device of this invention includes: a window data register for storing coordinate values of each of a plurality of window regions on a display screen, the plurality of window regions being displayed on the display screen by being superimposed on one another; and a mask data production section for producing mask data for a predetermined pixel by comparing coordinate values of the predetermined pixel on the display screen with the coordinate values of the window regions stored in the window data register before a predetermined window region among the plurality of window regions is displayed, wherein a decision whether or not pixel data for the predetermined pixel should be masked is determined based on the mask data produced in the mask data production section, and wherein the display of the predetermined pixel for displaying the predetermined window is performed based on the determination, wherein when the mask data for the predetermined pixel on the display screen is produced, the mask data for at least one pixel which is consecutive to the predetermined pixel is also produced, and when the pixel data for the predetermined pixel is renewed based on the mask data, the pixel data for the at least one pixel which is consecutive to the predetermined pixel is also renewed based on the mask data.

In one embodiment of the invention, the window control device includes a pixel array register for storing the number of pixels which includes the predetermined pixel and the at least one pixel which is consecutive to the predetermined pixel and data for indicating a direction of an array of the pixels.

Thus, according to the present invention, one set of mask data is produced for a plurality of consecutive pixels, and when the pixel data for a certain pixel of the plurality of consecutive pixels is displayed based on the mask data, the pixel data for at least one pixel which is consecutive to the certain pixel is also displayed based on the same mask data. This eliminates the necessity of repeating the production of the mask data for every pixel, and thus the problems of extending the operation time, lowering the display speed on the display screen, and increasing the power consumption can be prevented even if the number of window regions on the screen increases.

Thus, the invention described herein makes possible the advantage of providing a window control device which does not extend the operation time, lower the display speed on the display screen, or increase the power consumption even if the number of window regions on the display screen increases.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of examples with reference to the accompanying drawings.

Figure 1:
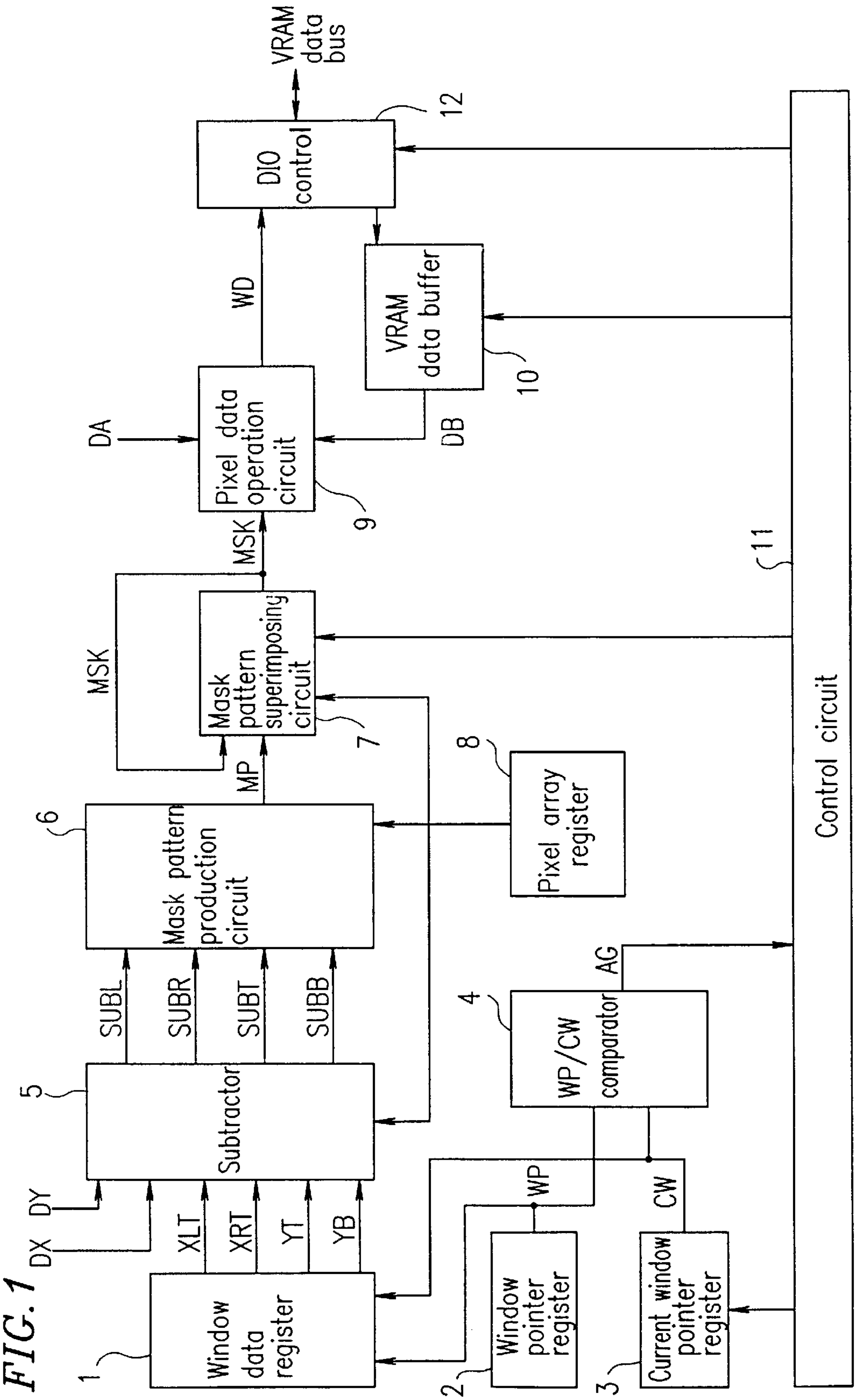
FIG. 1 is a block diagram illustrating an example of a window control device according to the present invention.

FIG. 1 is a block diagram illustrating an example of the window control device according to the present invention. The window control device includes a window data register 1, a window pointer register 2, a current window pointer register 3, a WP/CW comparator 4, a subtractor 5, a mask pattern production circuit 6, a mask pattern superimposing circuit (a window mask register) 7, a pixel array register 8, a pixel data operation circuit 9, a VRAM data buffer 10, a control circuit 11, and a DIO control circuit 12.

The window data register 1 stores data for defining the coordinates of the four corners of a rectangular window region. Specifically, the four pieces of coordinate data which are XLT (left), XRT (right), YT (top), and YB (bottom) are stored for one window region. The window data register 1 can store 16 sets of these four pieces of coordinate data at a maximum, and thus can correspond to a maximum of 16 windows.

The window pointer register 2 is a register for storing a window pointer WP which indicates a particular window by pointing to one of the 16 windows. The window pointer WP mainly plays two roles: indicating what is the number of the window for which the display data is to be produced; and indicating the number of windows for which the operation for obtaining mask data is to be performed.

The values in the window data register 1 and the window pointer register 2 are set by software control by a CPU (not shown).

The current window pointer register 3 stores a current window pointer CW for sequentially pointing to the plurality of windows. The current window pointer CW has a role, which is different from the window pointer WP, of indicating the number of the window for which the operation of obtaining the mask data is currently being performed. The current window pointer register 3 increases the current window pointer CW by one under the control of the control circuit 11. In this example, the current window pointer register 3 can increase the current window pointer CW from 0 to 15 so as to correspond to the 16 windows. The operation of the current window pointer register 3 will be described with greater detail later together with the operation of the WP/CW comparator 4.

The WP/CW comparator 4 compares the value of the window pointer WP of the window pointer register 2 with the value of the current window pointer CW of the current window pointer register 3, and outputs a "0" as an output AG if the values of WP and CW are not identical to each other and a "1" if they are identical to each other.

The subtractor 5 receives the coordinates (DX, DY) of one of a predetermined number of pixels for which pixel data is currently intended to be renewed (the value of an access pointer) from the CPU (not shown). The subtractor 5 also receives the coordinate data of the window region from the window data register 1. The subtractor 5 compares the coordinates (DX, DY) of the pixel with the coordinate data of the window region as a preliminary processing for determining whether the predetermined number of pixels are inside or outside the window region.

The mask pattern production circuit 6 determines whether the predetermined number of pixels for which the pixel data are currently intended to be renewed are inside or outside the window which is currently pointed to by the current window pointer CW based on four values which are obtained by the subtractor 5 (which will be described in greater detail later), and produces a mask pattern MP which represents the determination results. The mask pattern MP is produced whenever the current window pointer CW is increased, and output to the mask pattern superimposing circuit 7.

The mask pattern superimposing circuit 7 synthesizes the mask patterns MP produced by the mask pattern production circuit 6, to obtain a final set of mask data MSK. The mask pattern superimposing circuit 7 includes, for example, a combination of an AND gate and a latch. The operation of the mask pattern superimposing circuit 7 will be described in greater detail later in the discussion of the overall control flow.

The VRAM data buffer 10 stores display data for displaying the plurality of superimposed window regions on the display screen.

Whenever each of the predetermined number of pixels for which pixel data are currently intended to be renewed is selected, the pixel data operation circuit 9 produces final display data WD for the selected pixel based on the pixel data DB for the selected pixel stored in the VRAM data buffer 10, the pixel data DA for the selected pixel supplied from the external CPU, and the mask data MSK produced in the mask pattern superimposing circuit 7. The resultant display data WD is stored in the VRAM data buffer 10 to renew the pixel data DB for the selected pixel stored in the VRAM data buffer 10. Thus, the pixel data which is stored in the VRAM data buffer 10 and which corresponds to the predetermined number of pixels for which pixel data are intended to be renewed is renewed.

Hereinbelow, the processing steps for obtaining the final mask data MSK in the mask pattern superimposing circuit 7 will be described.

In the following description, assume that the pixel data for 16 laterally consecutive pixels, i.e., pixels located at coordinates (DX, DY), (DX+1, DY), . . . , (DX+15, DY) are intended to be renewed, and that the mask patterns MP and the final mask data MSK are composed of 16 bits to correspond to these pixels. The pixel array register 8 previously stores the value 16 as the number of pixels for which the pixel data are intended to be renewed and the lateral direction as the direction of the array of the pixels. Also assume that the window regions WP0, WP1, WP2 are superimposed on one another as shown in FIGS. 2A to 2D.

When the display data for the window region WP2 is intended to be displayed, the mask patterns MP are produced for the 16 pixels for which the pixel data are intended to be renewed for each of the window regions WP0, WP1, and WP2. The resultant mask patterns MP are synthesized to obtain the final mask data MSK.

More specifically, the subtractor 5 compares the coordinates (DX, DY) of the leftmost pixel among the 16 pixels with the coordinate data of the window region WP0 stored in the window data register 1 based on the formulae (1) to (4) below.

$$\text{Left: } SUBL=(DX+16)-XLT \tag{1}$$

$$\text{Right: } SUBR=XRT-DX \tag{2}$$

$$\text{Top: } SUBT=DY-YT \tag{3}$$

$$\text{Bottom: } SUBB=YB-DY \tag{4}$$

In formulae (1) to (4), XLT and XRT respectively denote the x coordinates of the left and right ends of the window region, and YT and YB respectively denote the y coordinates of the top and bottom ends of the window region.

If all the 16 pixels are located left of the left end of the window region WP0, a negative value is obtained from formula (1). If all the 16 pixels are located right of the right end of the window region WP0, a negative value is obtained from formula (2). If all the 16 pixels are located above the top end of the window region WP0, a negative value is obtained from formula (3). If all the 16 pixels are located below the bottom end of the window region WP0, a negative value is obtained from formula (4).

Accordingly, if a negative value is obtained from any one of the formulae (1) to (4), the array of 16 pixels is completely outside the window region WP0. Thus, when any one of the values SUBL, SUBR, SUBT, and SUBB output from the subtractor 5 is negative, the mask pattern production circuit 6 determines that all the 16 pixels are outside the window region WP0, produces "0000000000000000" as the 16-bit mask pattern MP based on the determination results and the data stored in the pixel array register 8, and outputs the resultant mask pattern MP to the mask pattern superimposing circuit 7.

If positive values are obtained from all of the formulae (1) to (4), at least one of the 16 pixels is inside the window region WP0. In this case, the mask pattern production circuit 6 produces the mask pattern MP based on the values SUBL and SUBR which are output from the subtractor 5.

Specifically, when the array of 16 pixels crosses the left end of the window region WP0, the number of pixels located inside the window region WP0 can be determined from the value SUBL. Thus, the corresponding mask pattern MP can be produced based on the determination results and the data stored in the pixel array register 8. For example, if SUBL=0, the number of pixels located inside the window region WP0 is 1, and thus the mask pattern MP is "0000000000000001".

When the array of 16 pixels crosses the right end of the window region WP0, the number of pixels located inside the window region WP0 can be determined from the value SUBR. The corresponding mask pattern MP can be produced based on the determination results and the data stored in the pixel array register 8. For example, if SUBR=1, the two rightmost pixels among the 16 pixels are located inside the window region WP0, and thus the mask pattern MP is "1100000000000000".

Figure 2A:
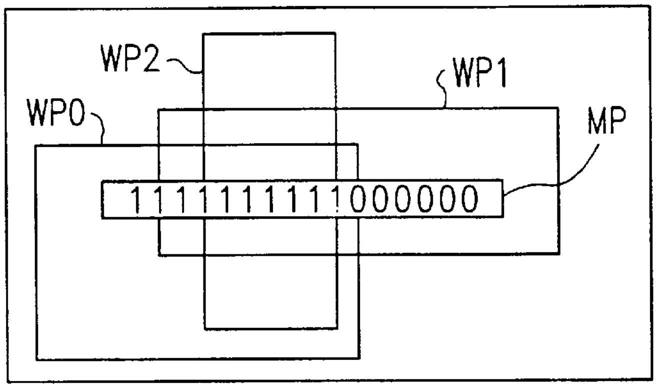
FIGS. 2A to 2D are views illustrating a plurality of window regions on a display screen.

In the example shown in FIGS. 2A to 2D, the mask pattern MP for the window region WP0 is "1111111111000000" as shown in FIG. 2A.

In such a mask pattern MP, "0" represents that the corresponding pixel data is masked, while "1" represents that the corresponding pixel data is displayed.

Figure 2B:
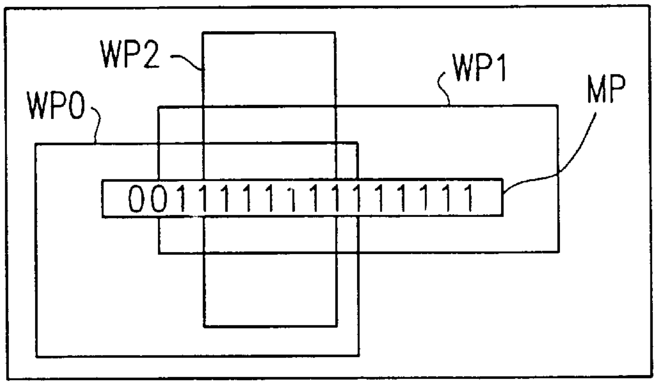

Subsequently, the subtractor 5 compares the coordinates (DX, DY) of the leftmost pixel among the 16 pixels with the coordinate data of the window region WP1 stored in the window data register 1 based on the formulae (1) to (4) above. The mask pattern production circuit 6 produces the mask pattern MP based on the values SUBL, SUBR, SUBT, and SUBB output from the subtractor 5 and outputs the resultant mask pattern MP. In this example, the mask pattern MP for the window region WP1 is "0011111111111111" as shown in FIG. 2B.

Figure 2C:
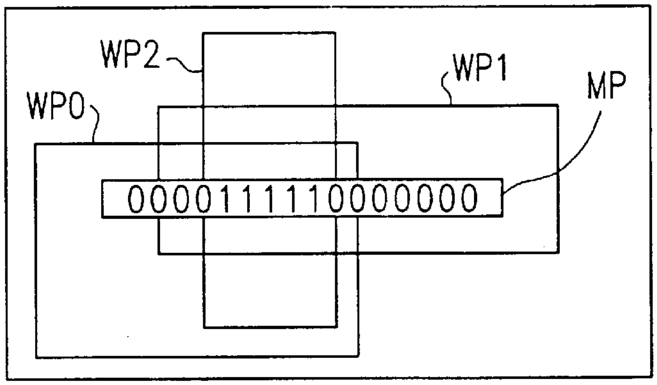

Likewise, the mask pattern MP for the window region WP2 of "0000111110000000" is produced as shown in FIG. 2C.

The thus-produced mask pa-sterns MP for the window regions WP0, WP1, and WP2 are sequentially input into the mask pattern superimposing circuit 7. The mask pattern superimposing circuit 7 superimposes these mask patterns MP to obtain the final mask data MSK. More specifically, the mask pattern superimposing circuit 7 temporarily stores the mask pattern MP for the window region WP0, outputs the mask pattern MP for the window region WP0 as the mask data MSK upon receipt of the mask pattern MP for the next window region WP1, and receives the output mask data MSK again, to calculate the logical AND of the mask pattern MP and the mask data MSK (that is, ANDing together the respective corresponding bits of the mask pattern MP and the mask data MSK one by one). The 16-bit mask data MSK is thus renewed and stored.

Consequently, the mask pattern superimposing circuit 7 outputs the renewed mask data MSK upon receipt of the mask pattern MP for the next window region WP2, and receives the output mask data MSK again, to calculate the logical AND of the mask pattern MP and the mask data MSK. The 16-bit master data MSK is thus renewed and stored. As a result, the final mask data MSK obtained by the logical AND of the mask patterns MP for the window regions WP0, WP1, and WP2 is stored in the mask pattern superimposing circuit 7, which is then supplied to the pixel data operation circuit 9.

Figure 2D:
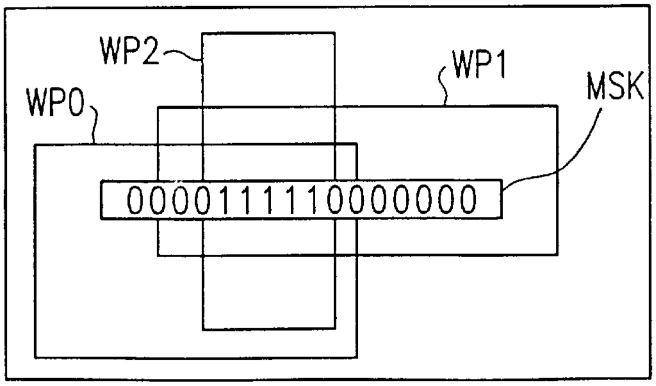

In this example, the final mask data MSK is "0000111110000000" as shown in FIG. 2D.

The above-described processings by the subtractor 5, the mask pattern production circuit 6, and the mask pattern superimposing circuit 7 may be realized by software, or by a simple hardware configuration as in the technique disclosed in the aforementioned Japanese Laid-Open Publication No. 4-97288 by the applicant of the present invention.

Figure 3:
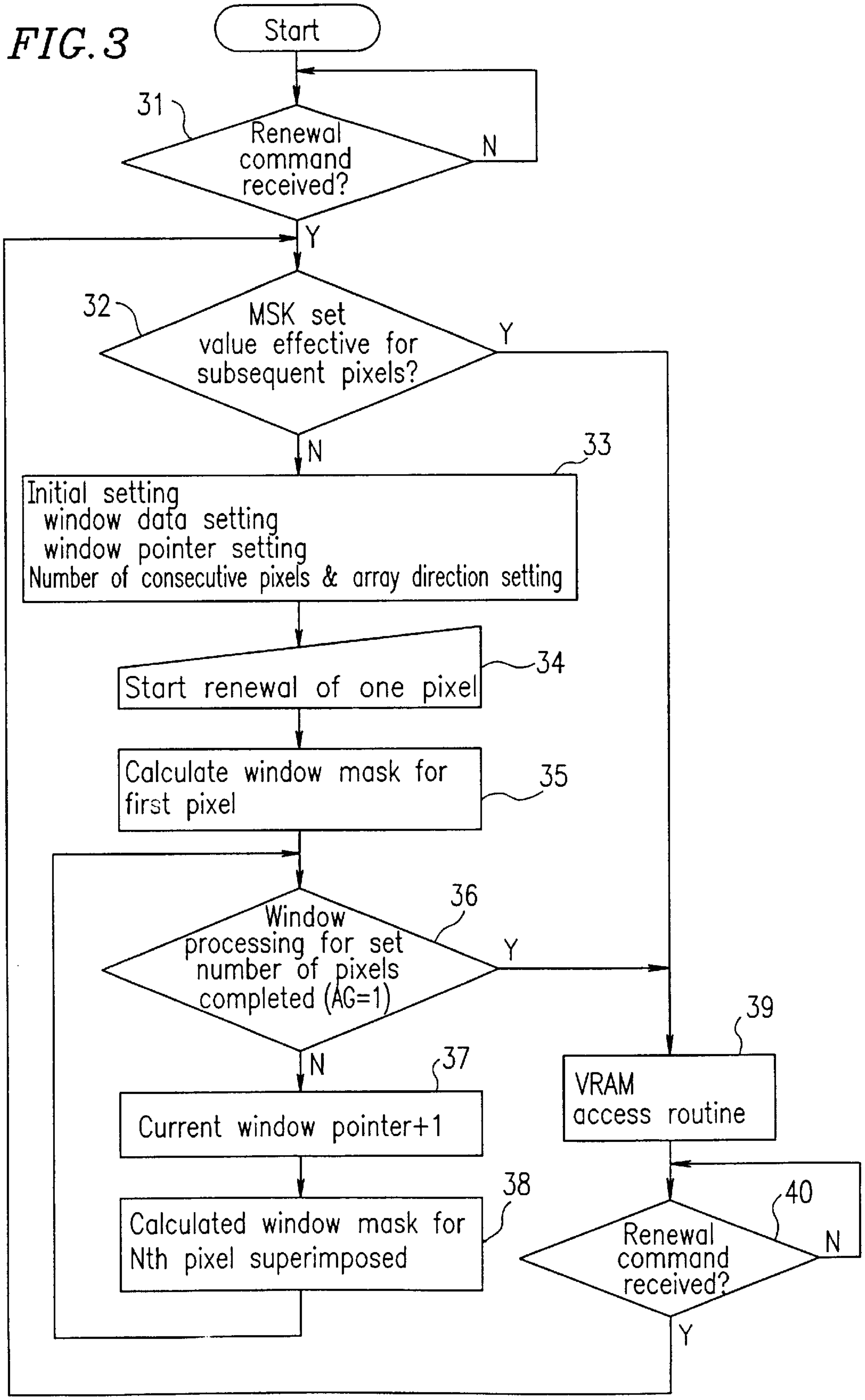
FIG. 3 is a flowchart illustrating the processing steps of the device of FIG. 1.

The operation of the window control device of this example will be described with reference to the flowchart of FIG. 3.

First, when an instruction to renew the pixel data for a pixel is received (step 31), a judgment is made whether or not the mask patterns for subsequent pixels have been formed (step 32). If the judgment is no (N), the process proceeds to step 33.

At step 33, the coordinate data of each window region is stored in the window data register 1, and the window pointer WP, indicating the number of the window for which display data is intended to be produced, is set in the window pointer register 2, under the control of the CPU (not shown). For example, the coordinate data of the window regions WP0, WP1, and WP2 shown in FIGS. 2A to 2D are stored in the window data register 1, and the window pointer WP (=2) indicating the window region WP2 for which display data is intended to be produced is stored in the window pointer register 2. Further, the value 16 as the number of pixels for which the pixel data are intended to be renewed and the lateral direction as the direction of the array of the pixels are stored in the pixel array register 8. The current window pointer CW of the current window pointer register 3 is initialized to "0", while all the bits constituting the mask data MSK stored in the mask pattern superimposing circuit 7 are initialized to "1" (i.e., all the 16 bits are initialized to the state where no masking is performed).

Then, the current window pointer CW (=0) is supplied to the window data register 1 from the current window pointer register 3. Upon receipt of the value, the window data register 1 supplies the coordinate data of the window region WP0 indicated by the current window pointer CW (=0) to the subtractor 5. The coordinates (DX, DY) of the pixel for which the pixel data is intended to be renewed are also supplied to the subtractor 5 (step 34).

The subtractor 5 compares the coordinates (DX, DY) of the pixel with the coordinate data of the window region WP0 based on the formulae (1) to (4) above, and outputs the values SUBL, SUBR, SUBT, and SUBB. On receipt of these values, the mask pattern production circuit 6 produces the 16-bit mask pattern MP for the window region WP0 (shown in FIG. 2A) and outputs the resultant mask pattern MP. On receipt of the mask pattern MP, the mask pattern superimposing circuit 7 outputs the initialized mask data MSK where all the bits are set at "1", and then inputs the output mask data MSK again to calculate the logical AND of the mask pattern MP and the output mask data MSK to renew the 16-bit mask data MSK. The resultant output mask data MSK is stored in the mask pattern superimposing circuit 7. Thus, the output mask data MSK in the mask pattern superimposing circuit 7 is the same as the mask pattern MP for the window region WP0 (step 35). The processing for the first window region is completed at step 35.

Thereafter, the WP/CW comparator 4 compares the window pointer WP in the window pointer register 2 with the current window pointer CW in the current window pointer register 3 (step 36). Since WP (=2) and CW (=0) are not the same at this time, the WP/CW comparator 4 supplies an output AG of "0". Since the output AG of the WP/CW comparator 4 is "0", the control circuit 11 increases the current window pointer CW of the current window pointer register 3 by one to "1" (step 37).

The renewed current window pointer CW (=1) is supplied to the window data register 1. The window data register 1 supplies the coordinate data of the window region WP1 indicated by the current window pointer CW (=1) to the subtractor 5. The subtractor 5 compares the coordinates (DX, DY) of the pixel for which the pixel data is intended to be renewed, which have been supplied to the subtractor 5, with the coordinate data of the window region WP1. The mask pattern production circuit 6 produces the 16-bit mask pattern MP for the window region WP1 (shown in FIG. 2B), and supplies the mask pattern MP to the mask pattern superimposing circuit 7. The mask pattern superimposing circuit 7 calculates the logical AND of the mask pattern MP for the window region WP1 and the mask data MSK stored in the mask pattern superimposing circuit 7. The calculation results are stored in the mask pattern superimposing circuit 7 as the renewed mask data MSK (step 38).

Subsequently, the WP/CW comparator 4 compares the window pointer WP with the current window pointer CW (step 36). Since WP (=2) and CW (=1) are again not the same, the output AG is again set at "0". In response to the output AG of "0", the control circuit 11 increases the current window pointer CW by one to "2" (step 37).

The window data register 1 supplies the coordinate data of the window region WP2 indicated by the current window pointer CW (=2) to the subtractor 5. The subtractor 5 compares the coordinates (DX, DY) of the pixel for which the pixel data is intended to be renewed, which has been supplied to the subtractor 5, with the coordinate data of the window region WP2. The mask pattern production circuit 6 produces the 16-bit mask pattern MP for the window region WP2 (shown in FIG. 2C). The mask pattern superimposing circuit 7 calculates the logical AND of the mask pattern MP for the window region WP1 and the mask data MSK stored in the mask pattern superimposing circuit 7 to renew the mask data MSK (step 38).

As described above, the mask pattern MP for the window region WP0 is first obtained at steps 34 and 35, and then the mask patterns MP for the window regions WP1 and WP2 are obtained by repeating the steps 37 and 38 so as to renew the mask data MSK for each case. As a result, the mask pattern superimposing circuit 7 stores the final mask data MSK obtained from the logical AND of the mask patterns MP for the window regions WP0, WP1, and WP2 (shown in FIG. 2D).

Once the final mask data MSK for the window region WP2 has been obtained, the current window pointer CW is 2. The WP/CW comparator 4 therefore determines that the window pointer WP (=2) and the current window pointer CW (=2) are the same, and sets the output AG at "1" (step 36). In response to the output AG (=1) of the WP/CW comparator 4, the control circuit 11 terminates the production of the mask patterns MP and the mask data MSK and executes a VRAM access routine for renewing the pixel data for the pixel at step 39.

In the VRAM access routine of step 39, for the renewal of the pixel data for the pixel located at the coordinates (DX, DY), the pixel data operation circuit 9 receives new pixel data DA for this pixel from the external CPU (not shown), the existing pixel data DB for this pixel from the VRAM data buffer 10, and the final mask data MSK from the mask pattern superimposing circuit 7. If the first bit of the mask data MSK corresponding to the pixel at the coordinates (DX, DY) is "0", for example, which indicates that new pixel data DA for this pixel should be masked, the pixel data operation circuit 9 selects the existing pixel data DB, not the new pixel data DA, and outputs the existing pixel data DB as the display data WD.

The display data WD (i.e., the existing pixel data DB) is transferred to the VRAM data buffer 10 via the DIO control circuit 12, and written in the VRAM data buffer 10 as the pixel data for the pixel located at the coordinates (DX, DY). As a result, the new pixel data DA is not written in the VRAM data buffer 10, which means that the pixel data DA is masked.

Thereafter, when an instruction to renew the pixel data for a pixel is received (step 40), the control circuit 11 determines at step 32 that the mask patterns for subsequent pixels have been formed since the final mask data MSK has been produced. The process then proceeds again to step 39, where the pixel data operation circuit 9 receives the new pixel data DA and the existing pixel data DB for the second pixel, i.e., the pixel located at the coordinates (DX+1, DY), so as to renew the pixel data for the second pixel. If the second bit of the mask data MSK corresponding to the pixel at the coordinates (DX+1, DY) is "1", for example, which indicates that the new pixel data DA for this pixel should be stored, the pixel data operation circuit 9 selects the new pixel data DA, and writes the new pixel data DA (i.e., the display data WD) in the VRAM data buffer 10 as the pixel data for the pixel at the coordinates (DX+1, DY).

The steps 40, 32, and 39 are repeated for the third to sixteenth pixels. When the corresponding bit in the mask data MSK is "0", the existing pixel data DB (display data WD) is rewritten in the VRAM data buffer 10 to mask the new pixel data DA. On the contrary, when the corresponding bit in the mask data MSK is "1", the new pixel data DA (display data WD) is written in the VRAM data buffer 10 to renew the existing pixel data DB.

For example, the final mask data MSK for displaying the window region WP2 is "0000111110000000" as shown in FIG. 2D. Accordingly, the pixel data DA for the first to fourth and tenth to sixteenth pixels are masked, while the pixel data DA for the fifth to ninth pixels are written in the VRAM data buffer 10 to renew the existing pixel data DB.

In this way, once the processing for the sixteenth pixel is completed, the process proceeds to step 33 again from step 32. The control circuit 11 increases a counter incorporated therein by one whenever the processing for one pixel is completed. When the value of the counter reaches a predetermined value, the control circuit 11 determines that the processings for all the pixels are completed and proceeds again to step 33 from step 32, to move to the processing for another set of 16 pixels.

When either the coordinate data of the window regions stored in the window data register 1 or the window pointer WP of the window pointer register 2 is renewed, the current final mask data MSK is no longer available. In such a case, the process proceeds to step 33 from step 32 where an instruction to renew the pixel data for a pixel is then received.

By repeating the above processing steps, all the display data for displaying the window region WP2 are written in the VRAM data buffer 10. As for the other window regions WP0 and WP1, also, the display data for displaying the windows corresponding to the window regions WP0, WP1, and WP2, respectively, where they are superimposed on one another on the display screen are written in the VRAM data buffer 10 by repeating similar processing steps.

Figure 4:
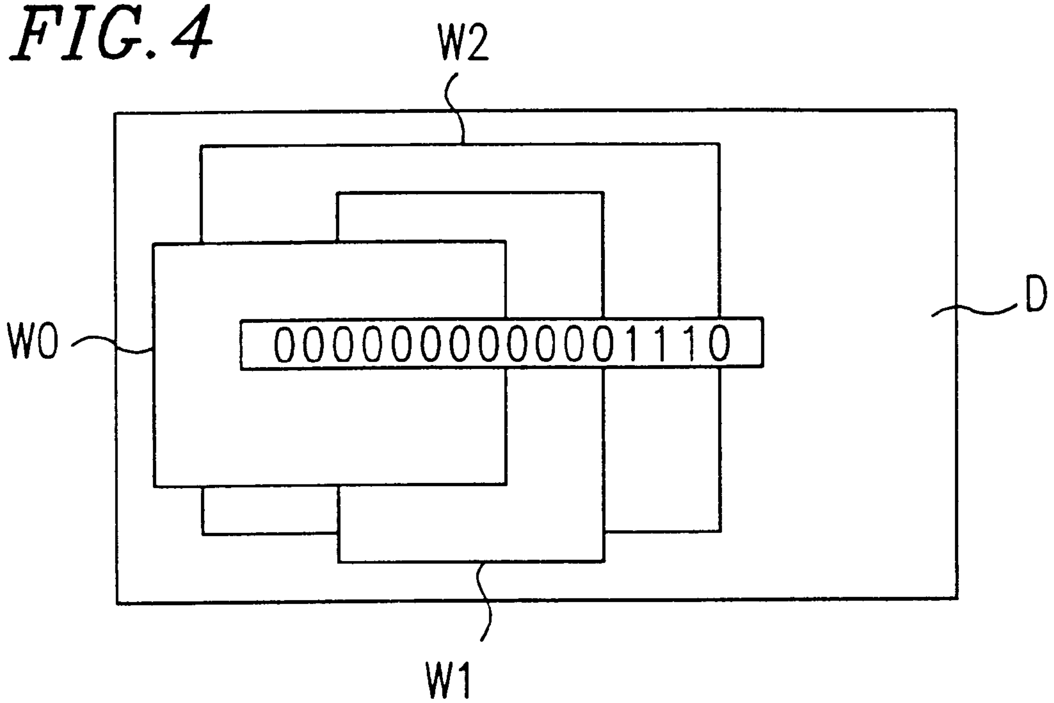
FIG. 4 is a view illustrating a plurality of window regions on a display screen.
Figure 5:
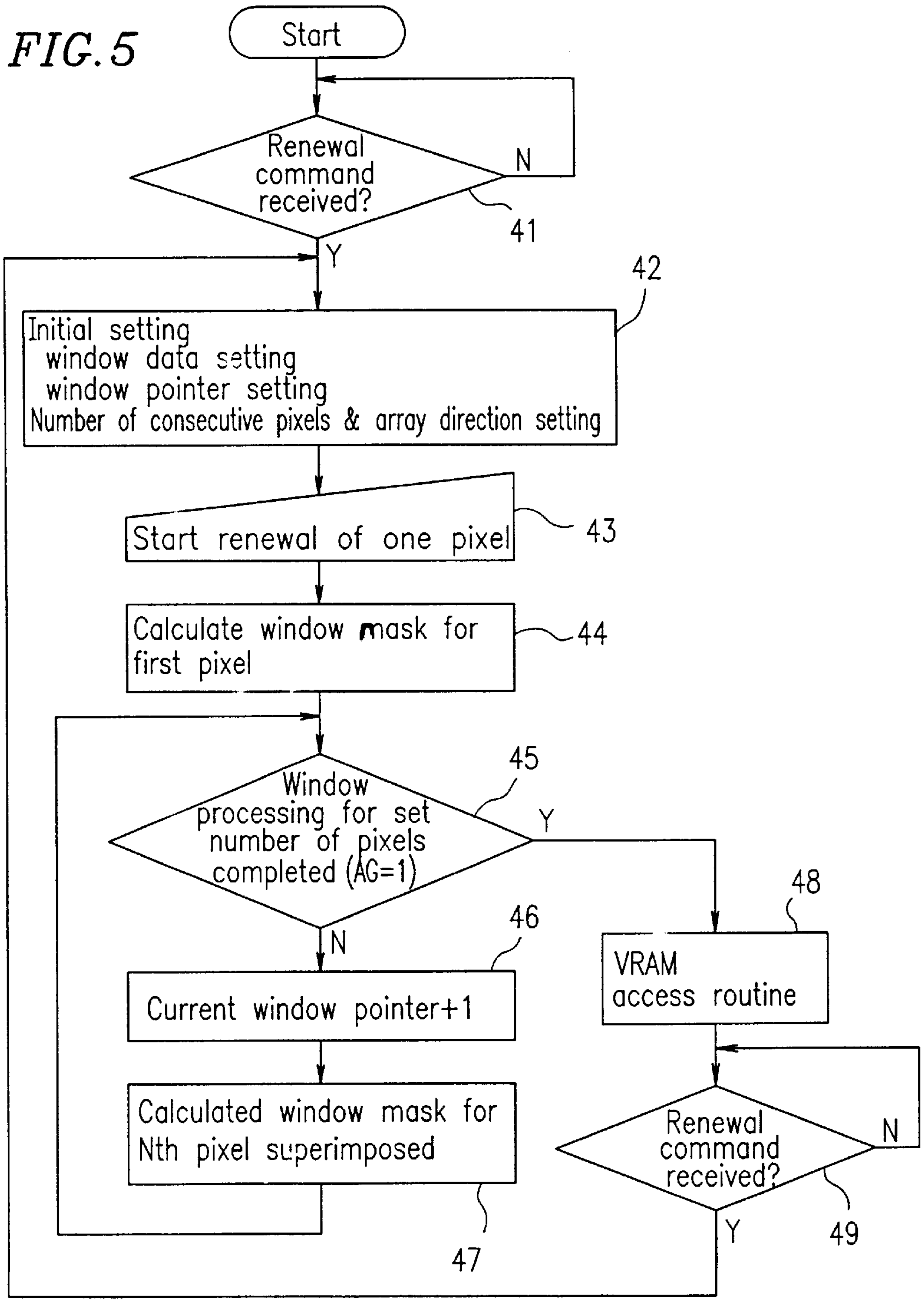
FIG. 5 is a flowchart illustrating a conventional process for producing mask data and the control of a VRAM.

Alternatively, the pixel data for pixels located inside a window region, not pixels located outside the window region, may be masked. In this case, a bit indicating whether the inside or outside of the window region should be masked may be added to the coordinate data of the window region stored in the window data register 1. Such a bit is read together with the coordinate data of the window region when the coordinate data is read from the window data register 1, to determine whether the inside or outside of the window region should be masked. The mask pattern for masking the inside of the window region can be obtained by inverting the mask pattern used when the outside of the window region is masked. In practice, either the inside or outside of the window region is selectively masked, so as to realize a variety of display forms as shown in FIG. 4, for example.

Thus, in this example, when an instruction to renew the pixel data for the first pixel is received, the mask data MSK for 16 pixels is formed. Therefore, when the pixel data for the first pixel is renewed based on the mask data MSK, the pixel data for the second to sixteenth pixels can be renewed using the same mask data MSK. This eliminates the necessity of repeating the formation of the mask data for every pixel, and thus the problems of increasing the operation time, lowering the display speed on the display screen, and increasing the power consumption can be prevented even if the number of window regions on the screen increases.

Various other modifications will be apparent to those skilled in the art without departing from the scope and spirit of this invention. Accordingly, it is not intended that the scope of the claims appended hereto be limited to the description as set forth herein, but rather that the claims be broadly construed.

What is claimed is:

1. A window control device for displaying a plurality of window regions superimposed on one another on a display screen, comprising:

mask data production means for producing mask data so that whether or not pixel data for displaying a predetermined window region among the plurality of window regions should be displayed on a predetermined pixel of the display screen is determined before the predetermined window region is displayed, and subsequently whether or not pixel data for displaying the predetermined window region should be displayed on at least one pixel which is consecutive to the predetermined pixel is determined, so that the mask data can indicate whether or not the respective pixel data should be displayed on the predetermined pixel and the at least one pixel; and pixel data renewing means for renewing the pixel data for the predetermined pixel based on the mask data, as well as the pixel data for the at least one pixel which is consecutive to the predetermined pixel based on the mask data.

2. A window control device according to claim 1, wherein the window control device comprises a pixel array register for storing the number of pixels which includes the predetermined pixel and the at least one pixel which is consecutive to the predetermined pixel, the maximum number of the pixels being sixteen or larger, and data for indicating a direction of an array of the pixels.

3. A window control device according to claim 1, wherein the mask data production means comprises subtracting means for obtaining differences between the coordinates of the predetermined pixel of the display screen and the predetermined window region and generates the mask data in accordance with the differences so as to indicate whether the predetermined pixel of the display screen is within or outside the predetermined window region.

4. A window control device according to claim 1, wherein the coordinates are shown in X-Y rectangular coordinates set in the display screen.

5. A window control device according to claim 1, wherein the window control device comprises mask pattern production means to produce a mask pattern for the predetermined window region based on the mask data.

6. A window control device according to claim 1, wherein the window control device comprises mask pattern superimposing means to superimpose the mask patterns to obtain a final mask data for displaying the plurality of window regions.

7. A window control device comprising:

a window data register for storing coordinate values of each of a plurality of window regions on a display screen, the plurality of window regions being displayed on the display screen by being superimposed on one another; and a mask data production section for producing mask data for a predetermined pixel by comparing coordinate values of the predetermined pixel on the display screen with the coordinate values of the window regions stored in the window data register before a predetermined window region among the plurality of window regions is displayed, wherein a decision whether or not pixel data for the predetermined pixel should be masked is determined based on the mask data produced in the mask data production section, and wherein the display of the predetermined pixel for displaying the predetermined window is performed based on the determination, wherein when the mask data for the predetermined pixel on the display screen is produced, the mask data for at least one pixel which is consecutive to the predetermined pixel is also produced, and when the pixel data for the predetermined pixel is renewed based on the mask data, the pixel data for the at least one pixel which is consecutive to the predetermined pixel is also renewed based on the mask data.

8. A window control device according to claim 7, wherein the window control device comprises a pixel array register for storing the number of pixels which includes the predetermined pixel and the at least one pixel which is consecutive to the predetermined pixel, the maximum number of the pixels being sixteen or larger, and data for indicating a direction of an array of the pixels.

* * * * *